(12) United States Patent
Spiller et al.

(10) Patent No.: US 8,943,708 B2
(45) Date of Patent: Feb. 3, 2015

(54) ANTI-FATIGUE PLY RIB CONSTRUCTION

(71) Applicant: TBL Licensing LLC, Wilmington, DE (US)

(72) Inventors: Bert Appleton Spiller, Dover, NH (US); Denis W. Norton, Plymouth, MN (US); Stephen D. Ammon, Merrimac, MA (US)

(73) Assignee: TBL Licsensing LLC, Wilmington, DE (US)

( * ) Notice: Subject to any disclaimer, the term of this patent is extended or adjusted under 35 U.S.C. 154(b) by 0 days.

(21) Appl. No.: 13/648,866

(22) Filed: Oct. 10, 2012

(65) Prior Publication Data

US 2013/0125415 A1    May 23, 2013

Related U.S. Application Data

(60) Provisional application No. 61/545,317, filed on Oct. 10, 2011, provisional application No. 61/664,217, filed on Jun. 26, 2012.

(51) Int. Cl.
*A43B 9/04* (2006.01)
*A43B 13/12* (2006.01)
*A43B 13/18* (2006.01)
(Continued)

(52) U.S. Cl.
CPC ... *A43B 7/32* (2013.01); *A43B 7/00* (2013.01); *A43B 1/0009* (2013.01); *A43B 3/0078* (2013.01); *A43B 7/144* (2013.01); *A43B 7/1445* (2013.01); *A43B 9/04* (2013.01); *A43B 13/181* (2013.01); *A43B 13/187* (2013.01); *A43B 23/028* (2013.01); *A43B 23/22* (2013.01); *B29D 35/0009* (2013.01); *B29D 35/142* (2013.01)

USPC .............................. 36/30 R; 36/17 R; 36/108

(58) Field of Classification Search
USPC ...... 36/17 R, 17 PW, 17 A, 30 R, 30 A, 76 R, 36/78, 107, 108
See application file for complete search history.

(56) References Cited

U.S. PATENT DOCUMENTS 2,869,253 A    1/1959  Sachs
RE24,897 E    11/1960  Schlecht
(Continued)

FOREIGN PATENT DOCUMENTS

JP    2006042869 A    2/2006
WO    0064292 A1    11/2000
(Continued)

OTHER PUBLICATIONS

International Search Report and Written Opinion for Application No. PCT/US2012/059562 dated Mar. 20, 2013.

*Primary Examiner* — Khoa Huynh
*Assistant Examiner* — Sharon M Prange
(74) *Attorney, Agent, or Firm* — Lerner, David, Littenberg, Krumholz & Mentlik, LLP

(57) ABSTRACT

An improved welt construction for use in a welted shoe is disclosed, in which the construction contains a number of components, including: (1) an anti-fatigue layer with tapered recesses for providing cushioning; (2) a rigid shock diffusion welt-frame back part; (3) a flexible forepart welt-frame; (4) a torsional shank; and (5) a flexible ply rib, which may surround a periphery of the support system. Methods of: (1) constructing a shoe utilizing the aforementioned welt construction; and (2) manufacturing the aforementioned welt construction through the use of a mold(s) are also disclosed.

19 Claims, 14 Drawing Sheets

(51) Int. Cl.
*A43B 23/00* (2006.01)
*A43B 7/32* (2006.01)
*A43B 7/00* (2006.01)
*A43B 1/00* (2006.01)
*A43B 3/00* (2006.01)
*A43B 7/14* (2006.01)
*A43B 23/02* (2006.01)
*A43B 23/22* (2006.01)
*B29D 35/00* (2010.01)
*B29D 35/14* (2010.01)

(56) References Cited

U.S. PATENT DOCUMENTS

| | | | |
|---|---|---|---|
| 3,693,270 A | 9/1972 | Murray | |
| 4,333,248 A | 6/1982 | Samuels | |
| 4,535,553 A * | 8/1985 | Derderian et al. | 36/28 |
| 4,673,605 A * | 6/1987 | Sias et al. | 428/120 |
| 5,224,277 A * | 7/1993 | Sang Do | 36/27 |
| 5,528,841 A | 6/1996 | Pozzobon | |
| 5,782,014 A * | 7/1998 | Peterson | 36/28 |
| 5,915,819 A | 6/1999 | Gooding | |
| 6,012,236 A | 1/2000 | Pozzobon et al. | |
| 6,038,790 A * | 3/2000 | Pyle et al. | 36/30 R |
| 6,381,876 B2 | 5/2002 | Krajcir | |
| 6,497,057 B1 | 12/2002 | Lee et al. | |
| 6,581,305 B2 * | 6/2003 | Ho | 36/102 |
| 6,752,450 B2 * | 6/2004 | Carroll, III et al. | 296/187.03 |
| 6,754,982 B2 * | 6/2004 | Reed et al. | 36/30 A |
| 6,802,138 B2 * | 10/2004 | McManus et al. | 36/28 |
| 6,926,947 B1 * | 8/2005 | Seckel | 428/174 |
| 6,939,599 B2 * | 9/2005 | Clark | 428/178 |
| 7,134,223 B2 | 11/2006 | Ganon | |
| RE40,757 E | 6/2009 | Covatch | |
| RE43,214 E | 2/2012 | Covatch | |
| 8,161,665 B2 | 4/2012 | Nakano | |
| 2001/0022039 A1 | 9/2001 | Krajcir | |
| 2002/0017038 A1 | 2/2002 | Umezawa | |
| 2003/0097768 A1 | 5/2003 | Baek | |
| 2003/0101620 A1 | 6/2003 | Reed et al. | |
| 2003/0150131 A1 | 8/2003 | McManus et al. | |
| 2010/0299967 A1 | 12/2010 | Atsumi et al. | |
| 2011/0185597 A1 * | 8/2011 | Guest | 36/127 |
| 2011/0247240 A1 | 10/2011 | Eder et al. | |
| 2012/0317836 A1 | 12/2012 | Voorhees | |

FOREIGN PATENT DOCUMENTS

| | | |
|---|---|---|
| WO | 2006017651 A1 | 2/2006 |
| WO | 2011050373 A1 | 4/2011 |

* cited by examiner

ANTI-FATIGUE PLY RIB CONSTRUCTION

CROSS-REFERENCE TO RELATED APPLICATIONS

The present application claims the benefit of the filing date of U.S. Provisional Patent Application Nos. 61/545,317 and 61/664,217, filed, respectively, on Oct. 10, 2011 and Jun. 26, 2012, the disclosures of which are hereby incorporated herein by reference.

BACKGROUND OF THE INVENTION

The present invention relates generally to articles of footwear, and in particular to articles of footwear having a cushioning support system suitable for use in a welted shoe.

Traditional Goodyear welted shoes, an example of which is found in FIG. 1, typically utilize an upper connected to a midsole component through the use of a welt, e.g., a strip of leather, rubber, or plastic that is stitched to the upper and midsole component. The midsole component, in some welt constructions, may include a cushioning layer that is attached to a stiff insole board made of non-woven and/or cellulose material. As shown in FIG. 1, such insole boards may also overly or rest on top of the aforementioned cushioning layer. Thus, a stiff material (e.g., the insole board) is usually disposed between the foot of a user and the cushioning material in some welt constructions. Additionally, while in this type of footwear construction the upper and midsole may be connected together by stitching, an outsole is usually attached to the midsole through the use of a high strength adhesive. The result is a relatively firm, but nevertheless workable piece of footwear, which will eventually mold to the wearer's foot. Welted shoes of this sort have been commonly sold in the footwear industry, since the outsole can be easily replaced and the upper and welt components saved for re-use.

Various techniques for constructing welted shoes of the type described above have also been developed. As one example, a piece of an upper may first be secured to a portion of a welt-frame, such as a flange extending about a bottom surface of the welt construction (e.g., the "ply rib" of FIG. 1), via a staple or other connection mechanism. After initially securing the upper to the welt-frame, a welt, in the form of a strip of leather, rubber, or plastic, may then be stitched over the upper and into the flange portion of the welt-frame, thus securing the upper to the welt-frame. This flange portion (e.g., the ply rib) may also be attached to a stiff insole board, which may be a single or dual layered material. Additionally, an insole may be placed over the insole board and an outsole may be placed over a midsole portion of the welt construction.

Particular geometries used with the aforementioned midsole have also been developed, in which a series of cones is formed into the midsole. In this midsole construction, however, a stiff insole board overlies a top surface of the midsole and is cemented thereto. Cushioning potential is, as a result, lost, since a series of cones cannot be formed into a top surface of the midsole (e.g., the surface which comes into contact with the insole board). The stiff insole board is also typically disposed between a user's foot and the midsole, thus resulting in further loss of cushioning potential. What's more, the multitude of components used with the aforementioned welt construction serves to increase the stiffness of the shoe and provide for a complicated construction. As such, much is wasted in the way of manufacturing costs.

BRIEF SUMMARY OF THE INVENTION

A first embodiment of the present invention includes a cushioning support system for use in an article of footwear. The cushioning support system may have a series of components comprising: (1) a cushioning layer having a top surface and a bottom surface, wherein a pattern of tapered recesses is formed into at least one of the top and bottom surfaces; (2) a welt-frame assembly attached to the bottom surface of the cushioning layer, the welt-frame assembly having a rear part and a separate forepart; and (3) a flexible ply rib attached to a periphery of the cushioning support system for securing to a welt. The cushioning support system may also include toe, heel, and arch regions and a longitudinal and lateral axis, the longitudinal axis extending from the toe region to the heel region and the lateral axis extending transverse to the longitudinal axis.

In further aspects of this embodiment, the pattern of tapered recesses includes frustum-shaped recesses formed into the at least one of the top and bottom surfaces of the cushioning layer, the pattern having a first frustum-shaped recess with a first depth and width and a second frustum-shaped recess with a second depth and width, each depth and width being different. Still further, the frustum-shaped recesses may include a first series of alternating first and second frustum-shaped recesses extending along the lateral axis of the support system, and a second series of alternating first and second frustum-shaped recesses extending along the longitudinal axis of the support system. It is also the case that the first frustum-shaped recess may extend into the top surface of the cushioning layer and the second frustum-shaped recess may extend into the bottom surface of the cushioning layer, the second frustum-shaped recess being inverted with respect to the first frustum-shaped recess.

In other aspects of the aforementioned first embodiment, the frustum-shaped recesses may be frustoconical or hexagonal in shape.

A second embodiment of the present invention may include a shoe having a cushioning support system as previously described with respect to the first embodiment. Thus, the shoe may include a cushioning support system having any of the features of the cushioning support system described with respect to the foregoing embodiment, and the further features set forth in the detailed description. Additionally, the shoe may include a welt for securing an upper of the shoe to the flexible ply rib, and, thus, the cushioning support system. Other aspects of this second embodiment may include: (1) an insole, which is connected to the top surface of the cushioning layer; (2) a midsole, which is attached to the bottom surface of the cushioning layer; and (3) an outsole connected to the midsole.

BRIEF DESCRIPTION OF THE DRAWINGS

A more complete appreciation of the subject matter of the present invention and of the various advantages thereof can be realized by reference to the following detailed description in which reference is made to the accompanying drawings in which.

DETAILED DESCRIPTION

In describing the preferred embodiments of the subject illustrated and to be described with respect to the drawings, specific terminology will be used for the sake of clarity. However, the invention(s) is not intended to be limited to any specific terms used herein, and it is to be understood that each specific term includes all technical equivalents, which operate in a similar manner to accomplish a similar purpose.

Figure 1:
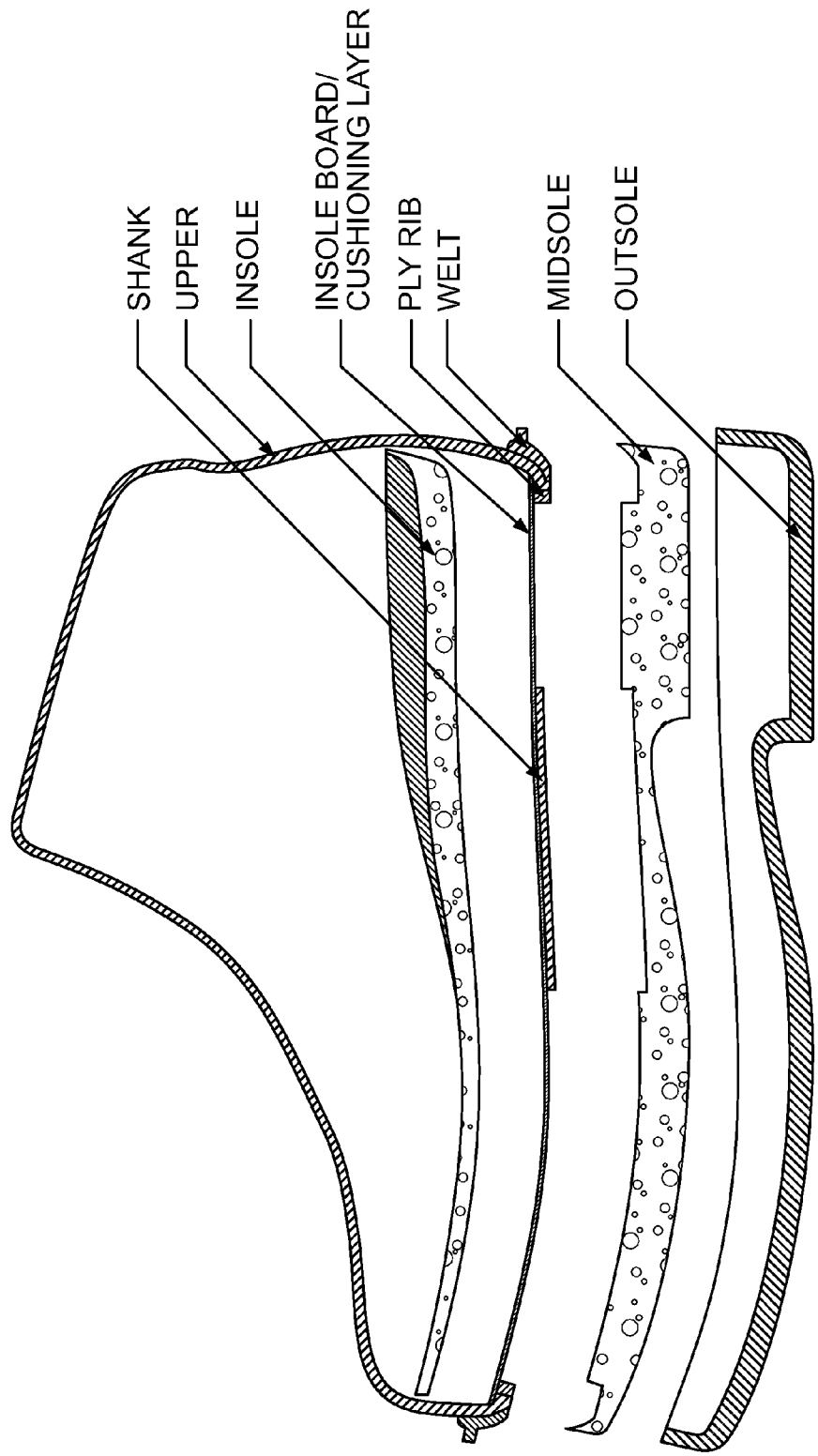
FIG. 1 is a cutaway view of a shoe utilizing a prior art welt construction.
Figure 2A:
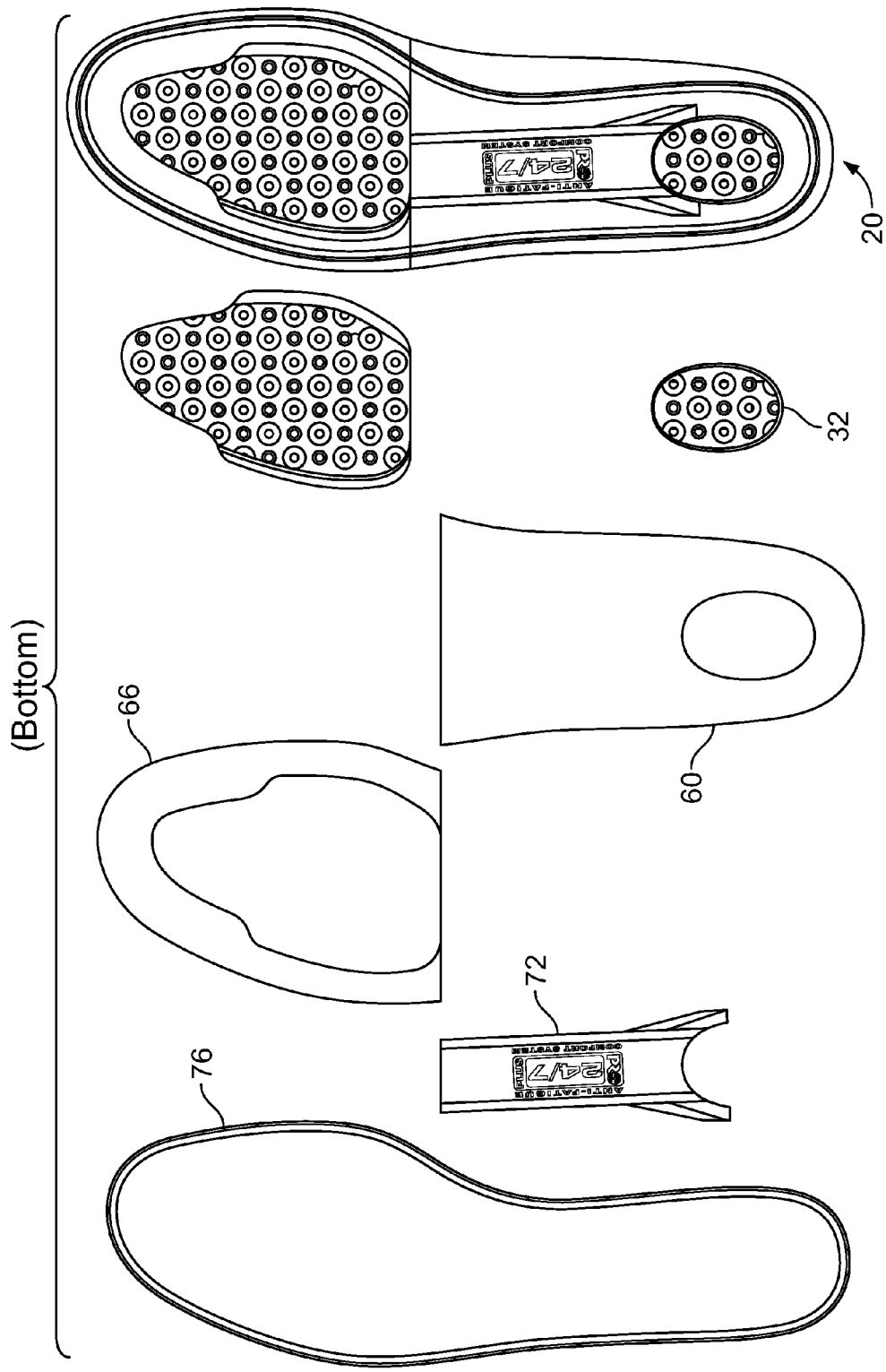
FIG. 2A is an exploded bottom view of a cushioning support system in accordance with one embodiment of the present invention.

Referring to FIG. 2A, a cushioning support system 20, which may be used as a welt-frame assembly for a shoe, includes several components, among which may be: (1) an inverted cone anti-fatigue layer 32 for providing cushioning and energy return; (2) a rigid shock diffusion welt-frame back part 60; (3) a flexible forepart welt-frame 66; (4) a torsional shank 72; and (5) a flexible ply rib 76, which may surround a periphery 26 of the support system 20. As described below, such components may cooperate to provide improved cushioning and support in a welted shoe, rendering the shoe more comfortable for an average user. The overall construction of the support system 20 may also result in a streamlined manufacturing process, which ultimately may reduce the costs associated therewith.

Figures 2B, 2C:
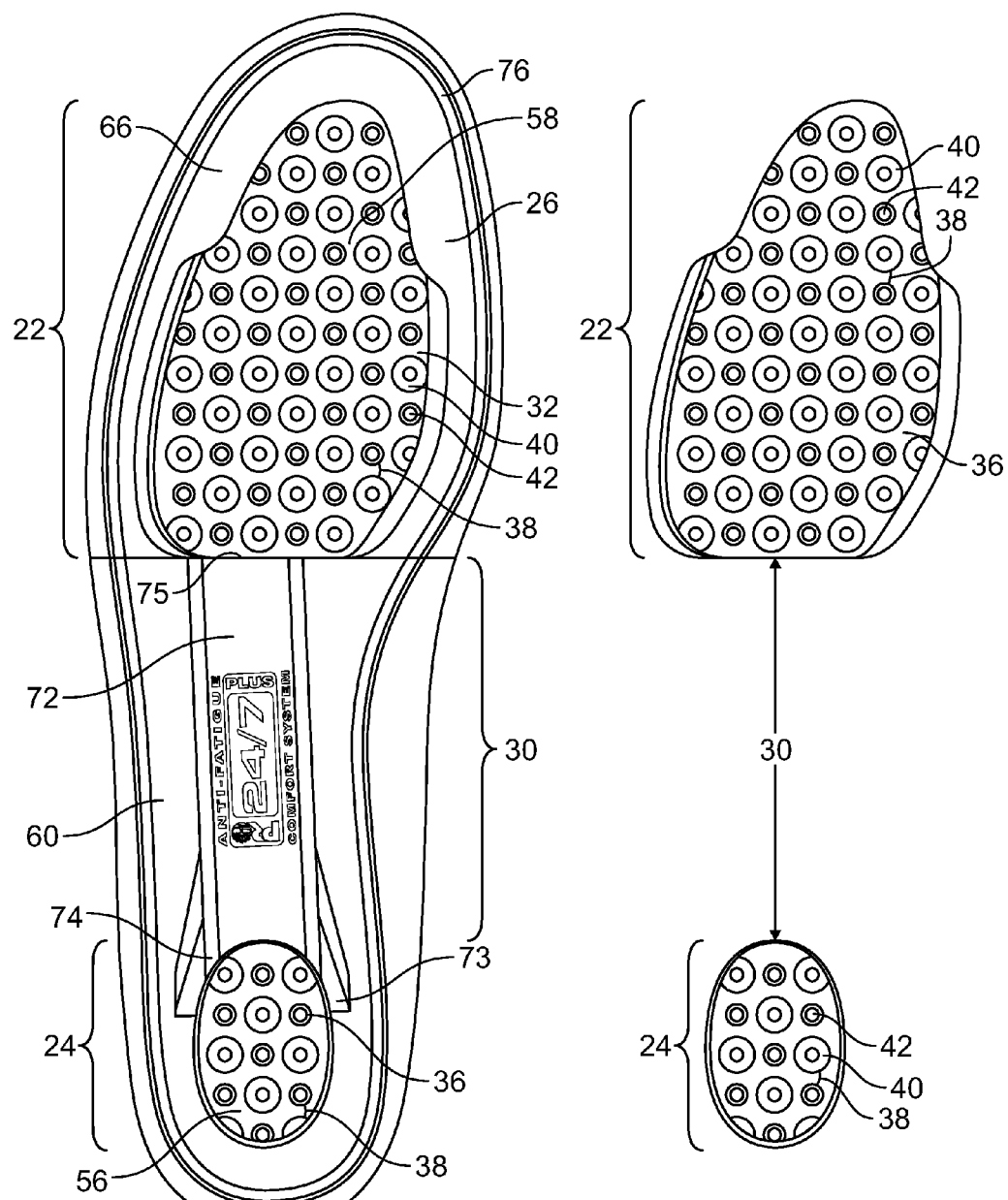
FIGS. 2B-G are various bottom views of the individual components of the cushioning support system of FIG. 2A.
Figure 3:
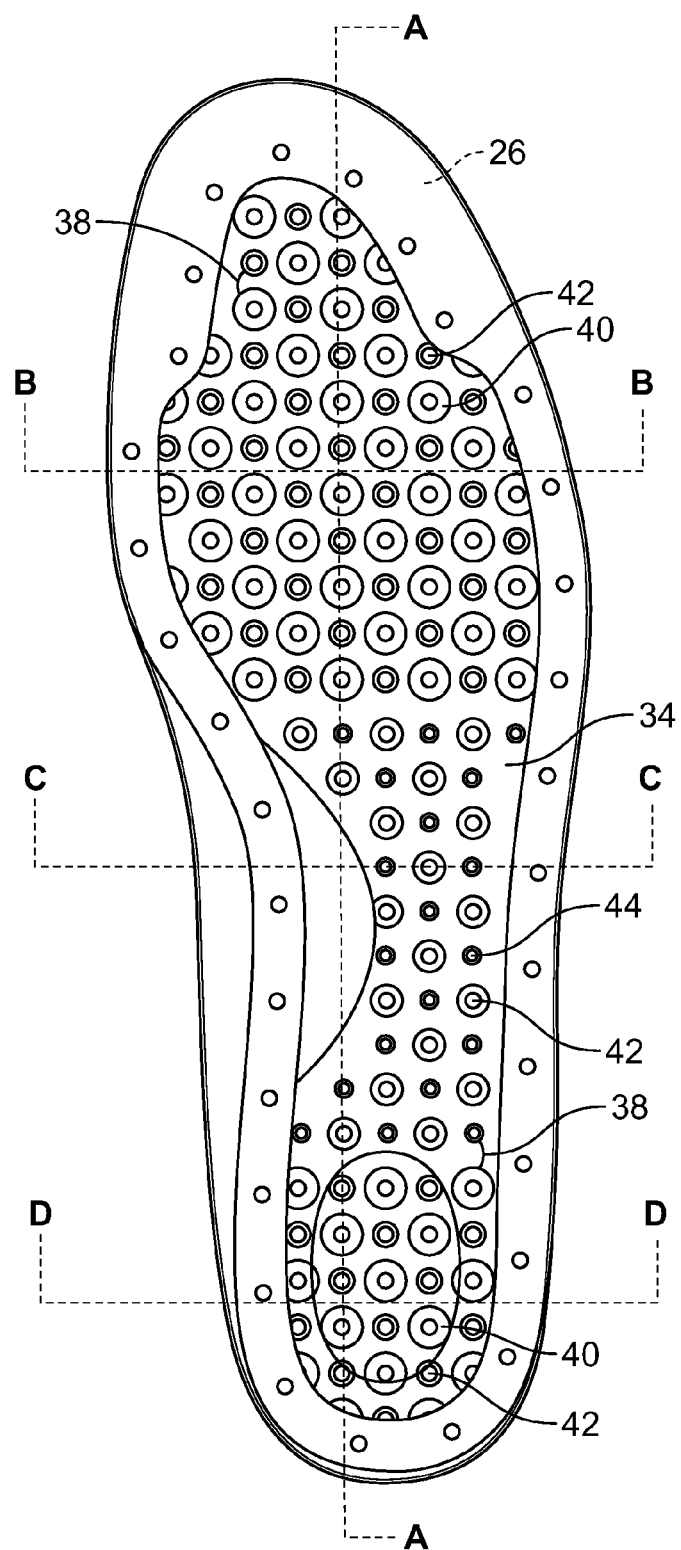
FIG. 3 is a top view of the cushioning support system of FIG. 2A.

Referring now to FIGS. 2B and 3, cushioning support system 20, in one embodiment, may have a toe region 22, a heel region 24, an arch region 30, and a periphery 26. Extending from toe region 22, through arch region 30, and into heel region 24 of support system 20 may be an inverted cone anti-fatigue layer 32, which provides support system 20 with improved cushioning and energy return characteristics. The anti-fatigue layer 32 included with cushioning support system 20 may also have a top surface 34 (FIG. 3) and a bottom surface 36 (FIG. 2B), both of which may have a pattern of resilient cones 38 formed thereon.

Figure 4A:
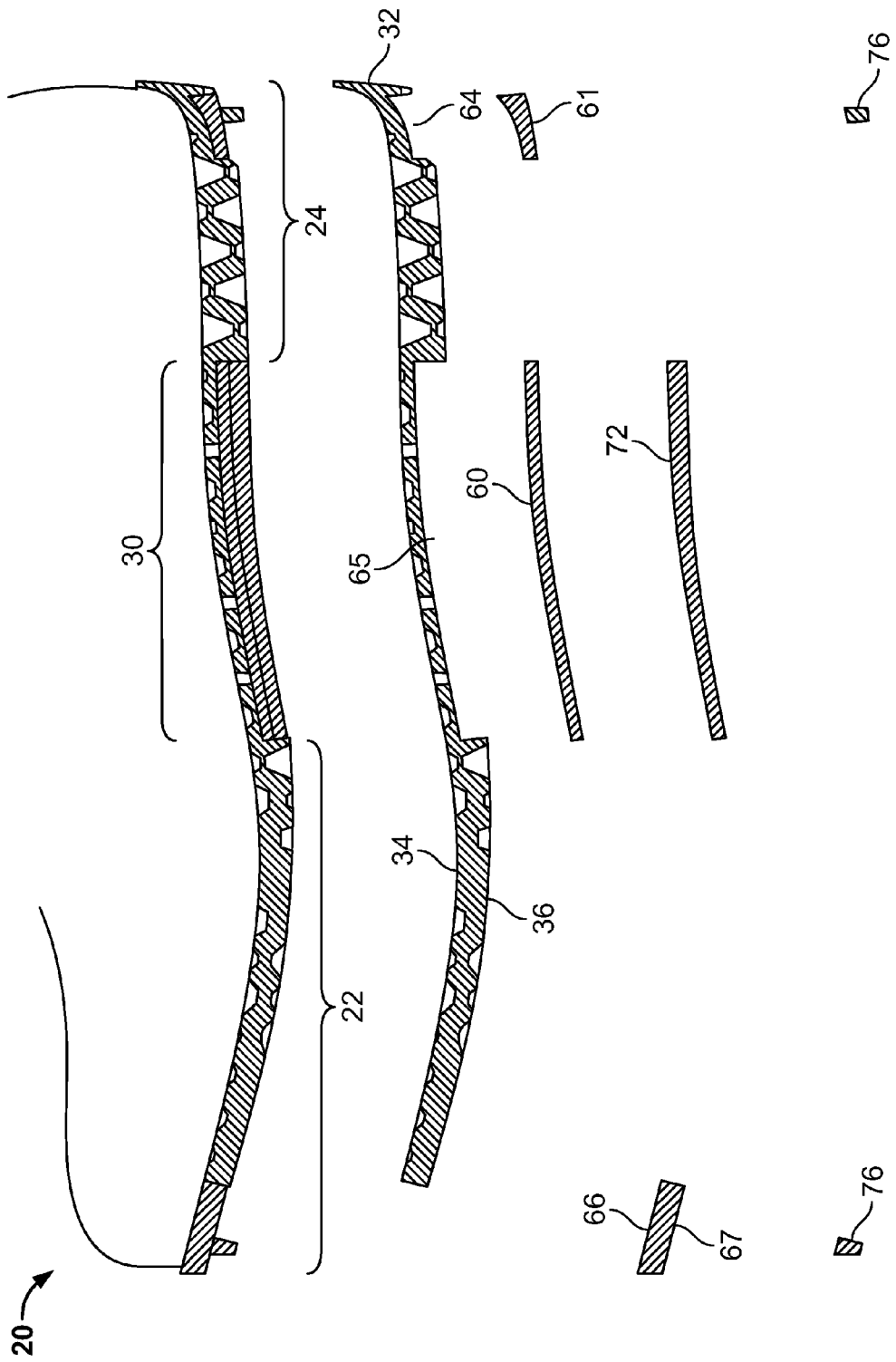
FIG. 4A is a cutaway view of the cushioning support system of FIG. 2A taken along line A-A of FIG. 3.
Figure 4B:
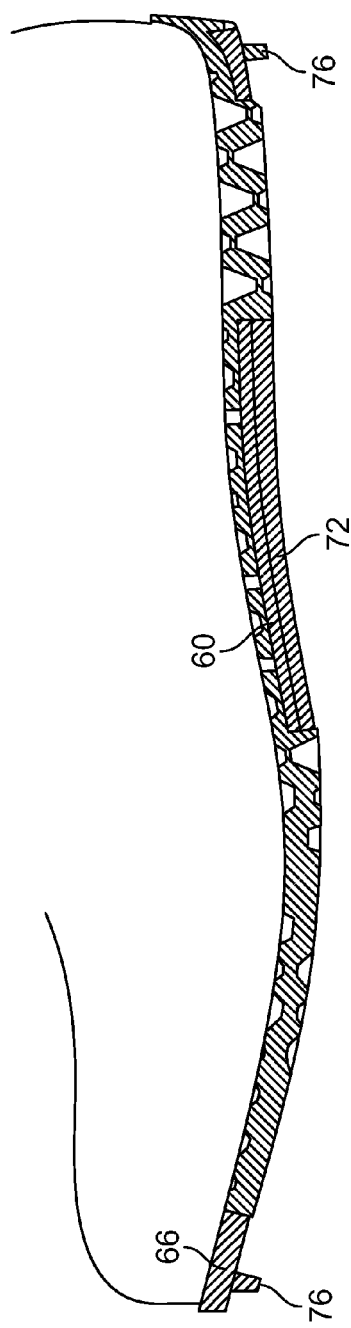
FIGS. 4B-C are various cutaway views of several components of the cushioning support system of FIG. 4A.
Figure 4C:
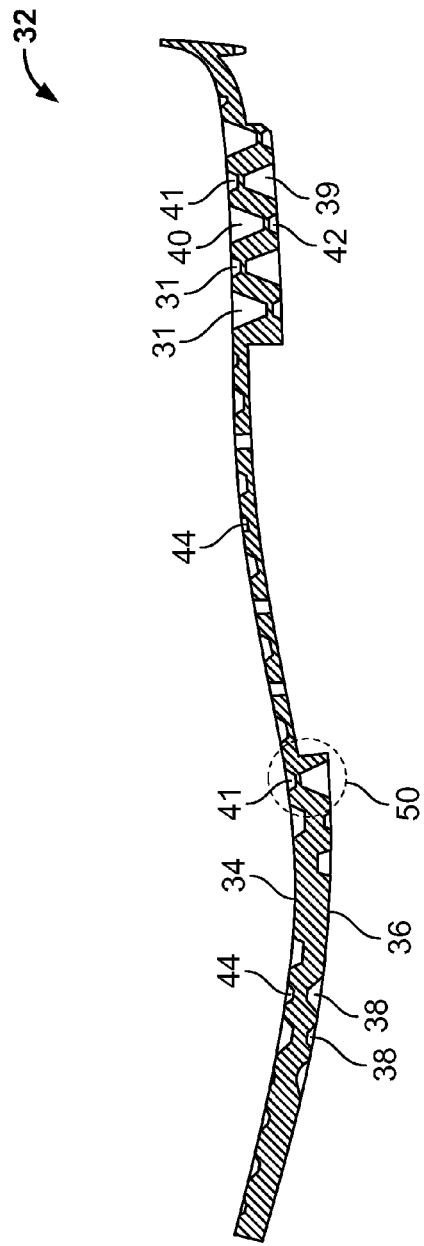
Figure 5A:
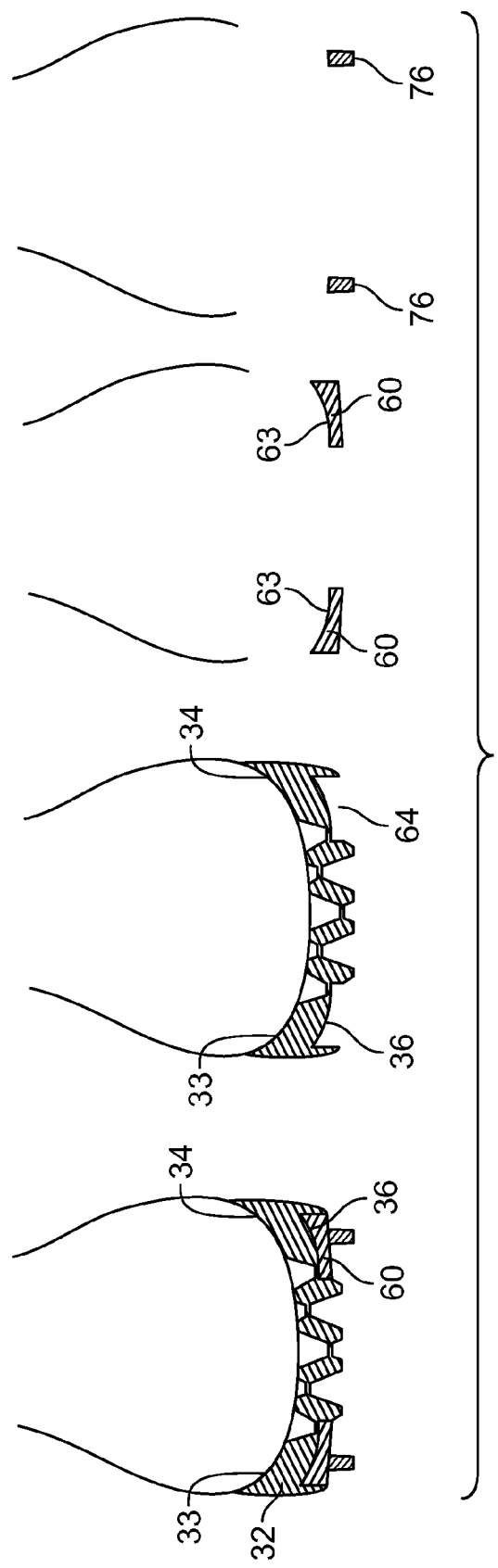
FIG. 5A is an exploded cross-sectional view of a heel portion of the cushioning support system of FIG. 2A taken along line D-D of FIG. 3.
Figure 5B:
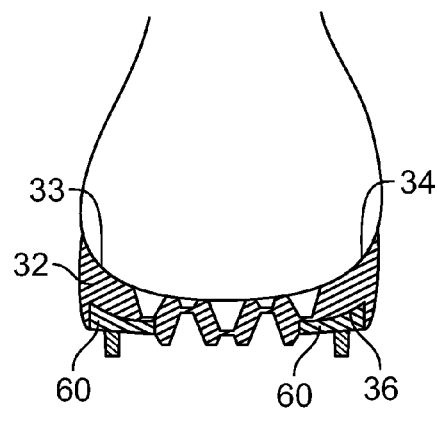
FIGS. 5B-E are various cross-sectional views of the individual components of the cushioning support system of FIG. 5A.
Figure 5C:
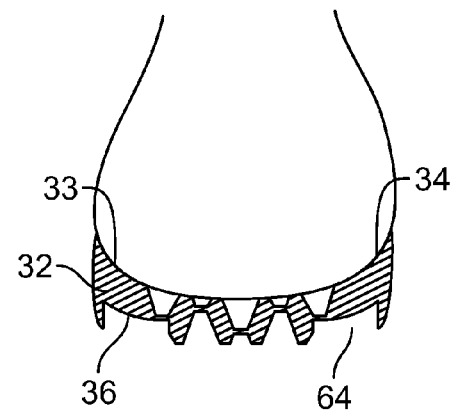
Figure 5D:
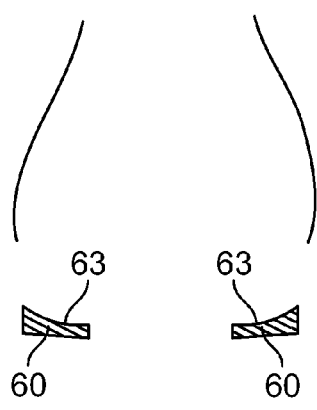
Figure 5E:
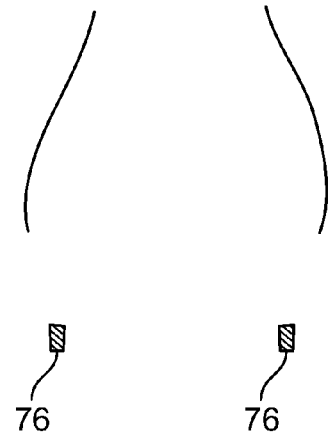

More specifically, as illustrated by the cutaway view of anti-fatigue layer 32 in FIG. 4C, individual cones 31 in a particular pattern of cones 38 may extend into either top or bottom surfaces 34, 36 of anti-fatigue layer 32. Such cones 31 may also have a generally frustoconical shape 39 terminating in a circular region 41. By extending inward into top and bottom surfaces 34, 36, respectively, these individual cones 31 may also be arranged in an opposing or inverted relationship with respect to one another. In other words, a particular cone 31 may extend into top surface 34 of anti-fatigue layer 32, and an opposing cone 31 may extend into bottom surface 36 of anti-fatigue layer 32, such that the cone 31 in bottom surface 36 may be inverted with respect to the cone 31 in top surface 34. Thus, in one embodiment of cushioning support system 20, a pattern of cones 38 formed into bottom surface 36 of anti-fatigue layer 32 may be arranged in an inverted relationship with respect to a pattern of cones 38 formed into top surface 34.

Referring still to FIG. 4C, individual cones 31 may, in one embodiment, also be arranged into various other patterns 38 on the top and bottom surfaces 34, 36 of anti-fatigue layer 32. Top and bottom surfaces 34, 36 of anti-fatigue layer 32 may, in fact, include individual cones 31 of differing depths and/or widths for creating such patterns 38. As an example, top and/or bottom surfaces 34, 36 of anti-fatigue layer 32 may include: (1) large cones 40, e.g., cones which, relative to other cones in a particular pattern of cones 38, have an increased or maximum depth and width; (2) medium cones 42, e.g., cones which, relative to other cones in a particular pattern of cones 38, have a medium depth and width; and (3) small cones 44, e.g., cones which, relative to other cones in a particular pattern of cones 38, have a decreased or minimum depth and width. In a particular embodiment, these large 40, medium 42, and small 44 cones may be arranged in different patterns 38 on either top or bottom surface 34, 36 of anti-fatigue layer 32 so as to provide different cushioning characteristics in different regions of support system 20 (e.g., toe region 22, heel region 24, and arch region 30).

As an example, a pattern of cones 38, as shown in FIG. 4C, may be arranged on both top and bottom surfaces 34, 36 of anti-fatigue layer 32, such that corresponding large 40 and medium 42 cones are both: (1) inverted with respect to one another; and (2) are arranged such that the circular region 41 of one cone is adjacent to the circular region 41 of another cone. More particularly, in one embodiment, a large cone 40 may be formed into bottom surface 36 of anti-fatigue layer 32, while a medium cone 42 may be formed into top surface 34 of anti-fatigue layer 32, thus placing medium cone 42 in an inverted relationship with respect to large cone 40. Further, the circular region of the large cone 40 may be arranged adjacent the circular region 41 of the medium cone 42, such that both circular regions 41 touch one another. For illustrative purposes, such opposing large 40 and medium 42 cones are shown at reference numeral 50 in FIG. 4C.

Referring now to FIG. 2B, in a particular embodiment, opposing large 40 and medium 42 cones as described above may be formed in heel 24 and toe 22 regions of support system 20, although other positions are also contemplated. Likewise, other patterns of cones are also contemplated, including a large cone being inverted with respect to a small cone 44, and/or a medium cone 42 being inverted with respect to a small cone 44, and so on. As a result, in one embodiment, a particular pattern of cones 38 may be arranged on support system 20, such that large 40, medium 42, and/or small 44 cones are: (1) inverted with respect to one another; and (2) have circular regions 41, which are arranged adjacent one another, as described above.

As shown in both FIG. 2C and FIG. 3, still other patterns of cones 38 may be used with support system 20. As one example, toe region 22 of support system 20 may include a pattern of cones 38 in which large 40 and medium 42 cones alternate with one another both laterally and longitudinally along support system 20. Stated differently, in a direction extending along line A-A in FIG. 3 (e.g., longitudinally along support system 20), a pattern of cones 38 may be formed in top and/or bottom surfaces 34, 36 of anti-fatigue layer 32, such that large 40 and medium 42 cones alternate with one another.

Similarly, in a direction extending along line B-B of FIG. 3 (e.g., laterally along support system 20), a pattern of cones 38 may be formed in top and/or bottom surfaces 34, 36 of anti-fatigue layer 32, such that large 40 and medium 42 cones also alternate with one another. Consequently, in toe region 22 of support system 20 (FIG. 2C), the pattern of cones 38 may be arranged such that substantially all large cones 40 are surrounded by adjacent medium cones 42. Likewise, substantially all medium cones 42 may be surrounded by adjacent large cones 40. Accordingly, within toe region 22 of support system 20, top and/or bottom surfaces 34, 36 of anti-fatigue layer 32 may include a pattern of cones 38 in which large cones 40 alternate with medium cones 42 both longitudinally and laterally along support system 20, so as to form the aforementioned pattern 38.

A similar pattern of cones 38 may also be formed in the heel region 24 of support system 20 on both top surface 34 (FIG. 3) and bottom surface 36 (FIG. 2C) of anti-fatigue layer 32. Thus, the pattern of cones 38 formed on top and/or bottom surfaces 34, 36 of anti-fatigue layer 32 may, nearing heel region 24 of support system 20, mirror or closely match the pattern of cones 38 formed in top and/or bottom surfaces 34, 36 of anti-fatigue layer 32, nearing toe region 22 of support system 20. For instance, a series of alternating large 40 and medium 42 cones may be arranged both longitudinally and laterally along support system 20, thus forming a pattern of cones 38 in the heel region 24 of support system 20, which is similar to the pattern of cones 38 formed in toe region 22 of support system 20.

Referring still to FIG. 2C and FIG. 3, arch region 30 of support system 20 may include a pattern of cones 38, which is slightly modified from the previous patterns described with respect to toe region 22 and heel region 24. Specifically, in a particular embodiment, arch region 30 may include a series of alternating medium 42 and small 44 cones formed into top surface 34 of anti-fatigue layer 32 (FIG. 3), which extend both longitudinally and laterally along support system 20. In other words, in a direction extending along line A-A of FIG. 3 (e.g., longitudinally along support system 20), a pattern of cones 38 may be formed in top surface 34, such that medium 42 and small 44 cones alternate with one another. Similarly, in a direction extending along line B-B of FIG. 3 (e.g., laterally along support system 20), a pattern of cones 38 may be formed in top surface 34, such that medium 42 and small 44 cones also alternate with one another. Consequently, in arch region 30 of support system 20, the pattern of cones 38 may be arranged such that substantially all medium cones 42 are surrounded by adjacent small cones 44. Likewise, substantially all small cones 44 may be surrounded by adjacent medium cones 42. Thus, top surface 34 of anti-fatigue layer 32 may, nearing arch region 30 of support system 20, contain a pattern of cones 38 in which a series of medium 42 and small 44 cones alternate with one another both longitudinally and laterally along support system 20.

Referring now to FIGS. 2B and 4A, support system 20 may also include a rigid shock diffusion welt-frame back part 60, which may overly bottom surface 36 of anti-fatigue layer 32 (FIG. 4A). In particular, welt-frame back part 60 may rest within respective channels 64, 65 formed in the bottom surface 36 of anti-fatigue layer 32. Moreover, such channels 64, 65 may, in one embodiment, be formed within heel 24 and arch 30 regions of support system 20 (FIG. 2B). In a particular embodiment, channel 65 may be formed within arch region 30 of support system 20 and may have a generally rectangular shape. In yet another embodiment, channel 64 may be formed within heel region 24 of support system 20 and may extend about a heel patch 56 of anti-fatigue layer 32, thus forming a generally oval channel 64.

Figure 2G:
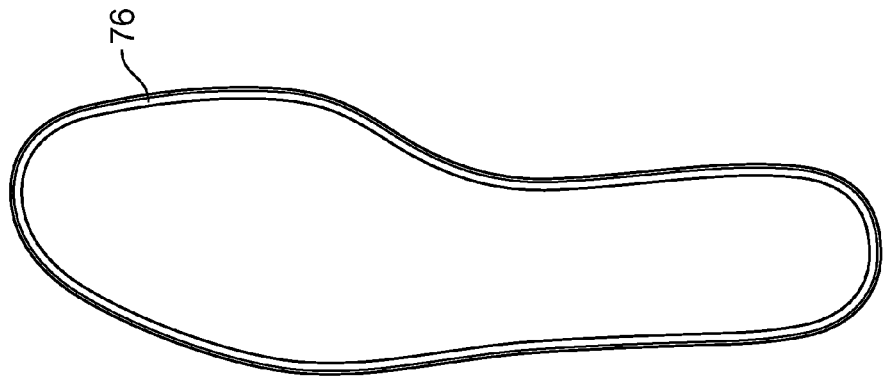
Figure 2F:
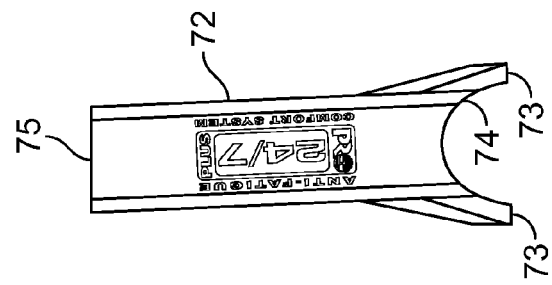
Figure 2E:
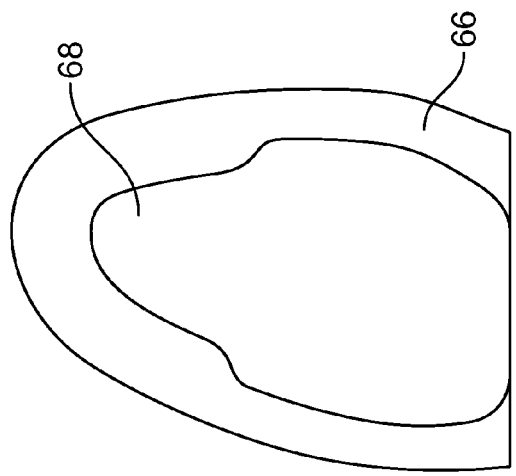
Figure 2D:
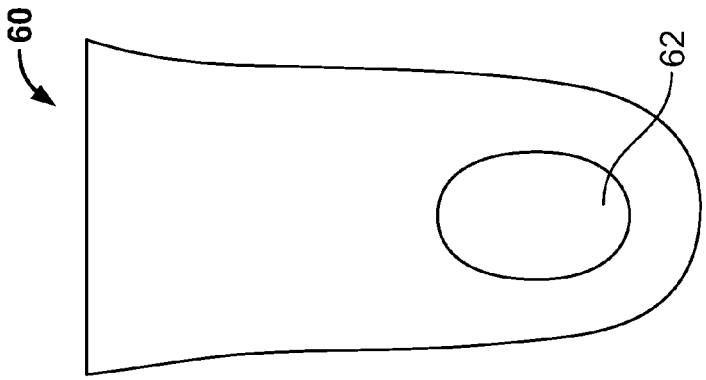

As shown in FIG. 2D, welt-frame back part 60 may also include an opening 62, which, in one embodiment, may accommodate the heel patch 56 of anti-fatigue layer 32. Even further, opening 62 may be oval, so as to mirror the oval shape of heel patch 56. Thus, it is contemplated that welt-frame back part 60 may overly bottom surface 36 of anti-fatigue layer 32, such that opening 62 is situated about heel patch 56, and the remainder of welt-frame back part 60 is accommodated within respective channels 64, 65 (FIG. 4A).

Referring now to FIGS. 5A-E, welt-frame back part 60 may also be slightly curved so as to complement a curvature 33 formed in anti-fatigue layer 32. Specifically, anti-fatigue layer 32 may, in one embodiment, have a curvature 33, which accommodates the natural shape of the heel and arch regions of the human foot. Such curvature 33 may, in fact, serve to restrict deformation of the foot upon contact with the top surface 34 of the anti-fatigue layer 32. In this way the curvature 33 of anti-fatigue layer 32 may prevent a local "sore spot" from resulting. In other words, upon contact with top surface 34 of anti-fatigue layer 32, a user's foot may be surrounded by the curvature 33 of anti-fatigue layer 32, such that the user's foot may be compressed inwardly. The natural padding of the human foot is thusly retained, which is in contrast to other non-curved structures. Specifically, upon contact with a flat surface, the human foot may deform and spread out over a larger area than is otherwise the case. The natural padding of the foot may therefore be lost, resulting in a less cushioning potential. To counteract this effect, anti-fatigue layer 32 may have a curvature 33, as described, and welt-frame back part 60 may also have a curvature 63, which cooperates with the curvature 33 of anti-fatigue layer 32. In a particular embodiment, channel 64 in bottom surface 36 of anti-fatigue layer 32 may be curved, such that the curvature 63 of welt-frame back part 60 fits flush within such channel 64. Improved cushioning is thusly created in the heel 24 and arch 30 regions of support system 20 via the curvature 33 of anti-fatigue layer 32 and the curvature 63 of welt-frame back part 60.

Cushioning support system 20 may also utilize a rigid shock diffusion welt-frame back part 60, which is similar in construction to the shock diffusion mechanism disclosed in U.S. Pat. No. 6,205,683, hereby incorporated by reference in its entirety. Thus, like the shock diffusion mechanism of the '683 patent, welt-frame back part 60 may vary in rigidity so as to accommodate different end uses (e.g., enthusiast hiking, recreational hiking, multi-purpose, etc.) Even further, welt-frame back part 60 may, due to its rigidity, serve as a support when a user stands in a strained position (e.g., while standing on a ladder rung), and/or may act to spread out or disperse ground forces upon heel contact. Thus, welt-frame back part 60 may increase the stability of cushioning support system 20.

Additionally, many of the materials utilized to construct the shock diffusion mechanism of the '683 patent may also be suitable for welt-frame back part 60, such materials including, but not being limited to, glass-filled nylon, composites, nylon, polypropylene, urethane, engineered thermal plastics, and the like.

Referring now to FIGS. 2A and 2B, cushioning support system 20 may also include a flexible forepart welt-frame 66, which may be co-molded, or joined in some other manner (e.g., through an adhesive or stitching), to rigid shock diffusion welt-frame back part 60. Yet, in contrast to welt-frame back part 60, which may be located in heel region 24 of support system 20, flexible forepart welt-frame 66 may be located in the toe region 22 of support system 20 (FIG. 2B). More specifically, forepart welt-frame 66 may be formed about a toe patch 58 of anti-fatigue layer 32, such that forepart welt-frame 66 surrounds toe patch 58. Accordingly, in a particular embodiment, forepart welt-frame 66 may provide a protective toe support structure for use in safety footwear applications.

Figure 6A:
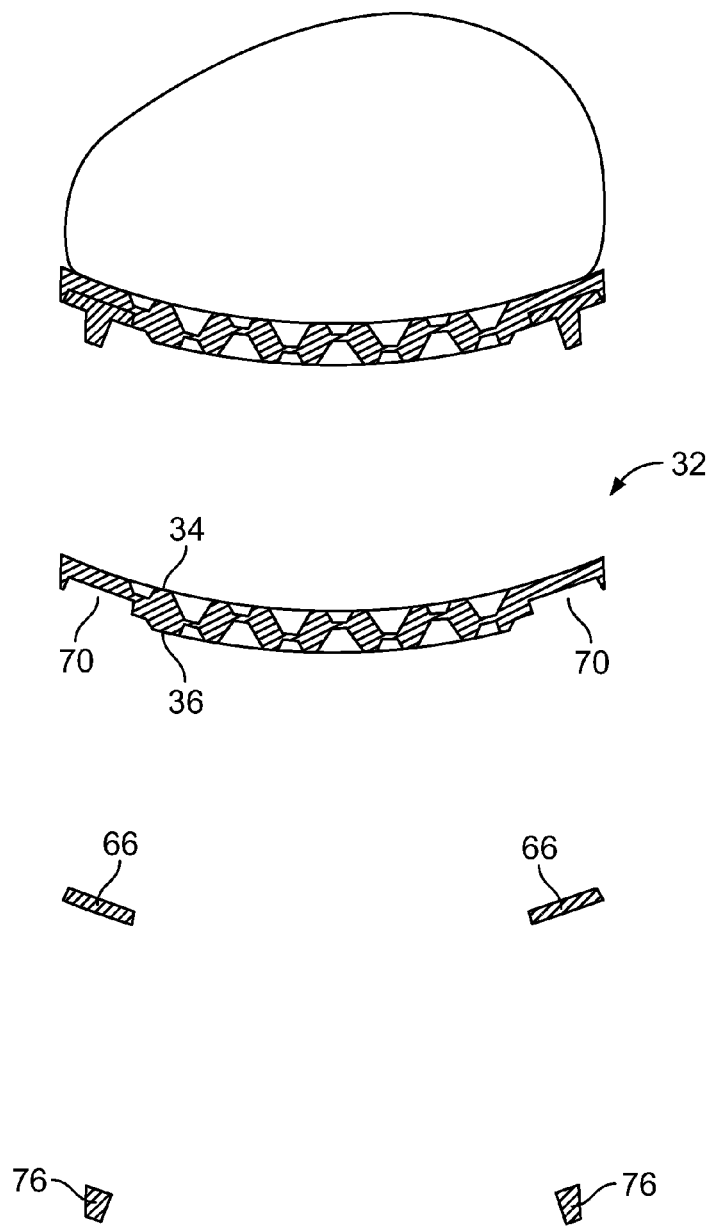
FIG. 6A is an exploded cross-sectional view of a forefoot portion of the cushioning support system of FIG. 2A taken along line B-B of FIG. 3.
Figure 6B:
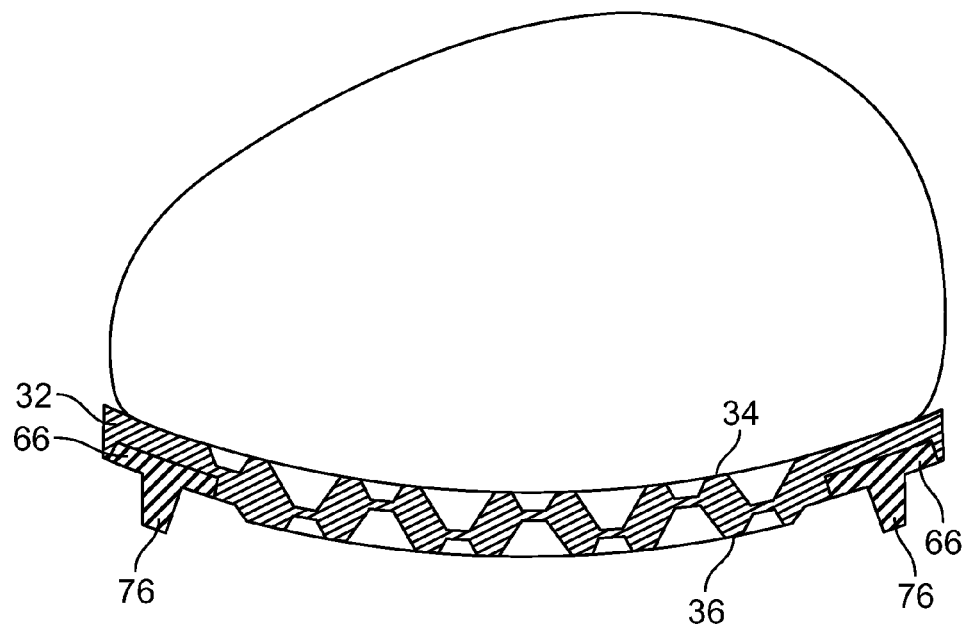
FIGS. 6B-C are various cross-sectional views of several components of the cushioning support system of FIG. 6A.
Figure 6C:
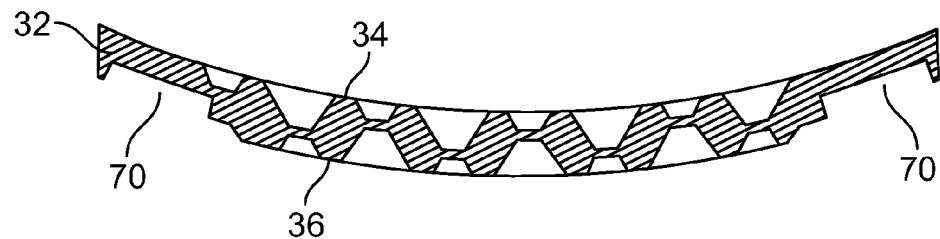

Referring to FIGS. 2E and 6A-C, in a particular embodiment, an opening 68 may also be provided in flexible forepart welt-frame 66 (FIG. 2E), such that forepart welt-frame 66 may be received into a channel 70 formed in bottom surface 36 of anti-fatigue layer 32 (FIG. 6A). As such, in one embodiment, channel 70 may surround toe patch 58 so as to create an oval-type channel 70 for accommodating forepart welt-frame 66. Thus, like welt-frame back part 60, flexible forepart welt-frame 66 may also overly the bottom surface 36 of anti-fatigue layer 32.

Flexible forepart welt-frame 66 may also be composed of a flexible plastic material, which, relative to rigid shock diffusion welt-frame back part 60, provides increased compliance in the toe region 22 of support system 20. Such flexibility may allow for proper function of the foot in the propelling and push-off stage of motion, and may further provide sure footedness for a user of support system 20 (e.g., the relative flexibility of forepart welt-frame 66 may allow a user to have an improved feel for the ground). Suitable materials for use with flexible forepart welt-frame 66 may include, but are not limited to, thermoplastic urethanes, engineered thermal plastics, and nylon.

Referring now to FIGS. 2B and 4A, a torsional shank 72 may also be included with cushioning support system 20 for providing stability to the arch 30 and heel 24 regions of support system 20. In a particular embodiment, torsional shank 72 may overly welt-frame back part 60 within arch region 30 of support system 20 (FIG. 2B). Specifically, similar to welt-frame back part 60, torsional shank 72 may be received within channel 65 in bottom surface 36 of anti-fatigue layer 32 (FIG. 4A). Thus, both torsional shank 72 and welt-frame back part 60 may occupy channel 65, which may be formed in anti-fatigue layer 32 within arch region 30 of support system 20.

As shown in FIGS. 2B and 2F, torsional shank 72 may also, in one embodiment, be generally Y-shaped (FIG. 2F), with one end of the shank 72 having a curvature 74 for abutting against a portion of heel patch 56 (FIG. 2B), and an opposing end having a squared-off section 75 for abutting against a portion of toe patch 58. Consequently, torsional shank 72 may overly arch region 30 of support system 20 from toe patch 58 to heel patch 56 of anti-fatigue layer 32 (FIG. 2B). Further, in one embodiment, due to the Y-shape of torsional shank 72, a series of legs 73 may be formed at one end of the shank 72 for surrounding heel patch 56. This general Y-shape of shank 72 may also provide for increased torsional stability, with shank 72 resisting twisting as a result of the legs 73 projecting from the curvature 74 end of shank 72. Thus, the shank 72 may offer increased stability in the arch 30 and heel 24 regions of cushioning support system 20.

Referring to FIGS. 2B, 2G, and 4A, cushioning support system 20 may also include a flexible ply rib 76 (FIG. 2G) that traverses a periphery 26 of support system 20 (FIG. 2B). In a particular embodiment, flexible ply rib 76 may extend from a bottom surface 67 of flexible forepart welt-frame 66, and from a bottom surface 61 of rigid shock diffusion welt-frame back part 60 (FIG. 4A). As a result, flexible ply rib 76 may form a flange, which extends about the periphery 26 of support system 20. In one embodiment, flexible ply rib 76 may extend completely around the periphery 26 of support system 20; although it is equally contemplated that flexible ply rib 76 may extend only partially around the periphery 26 of support system 20.

Figure 7:
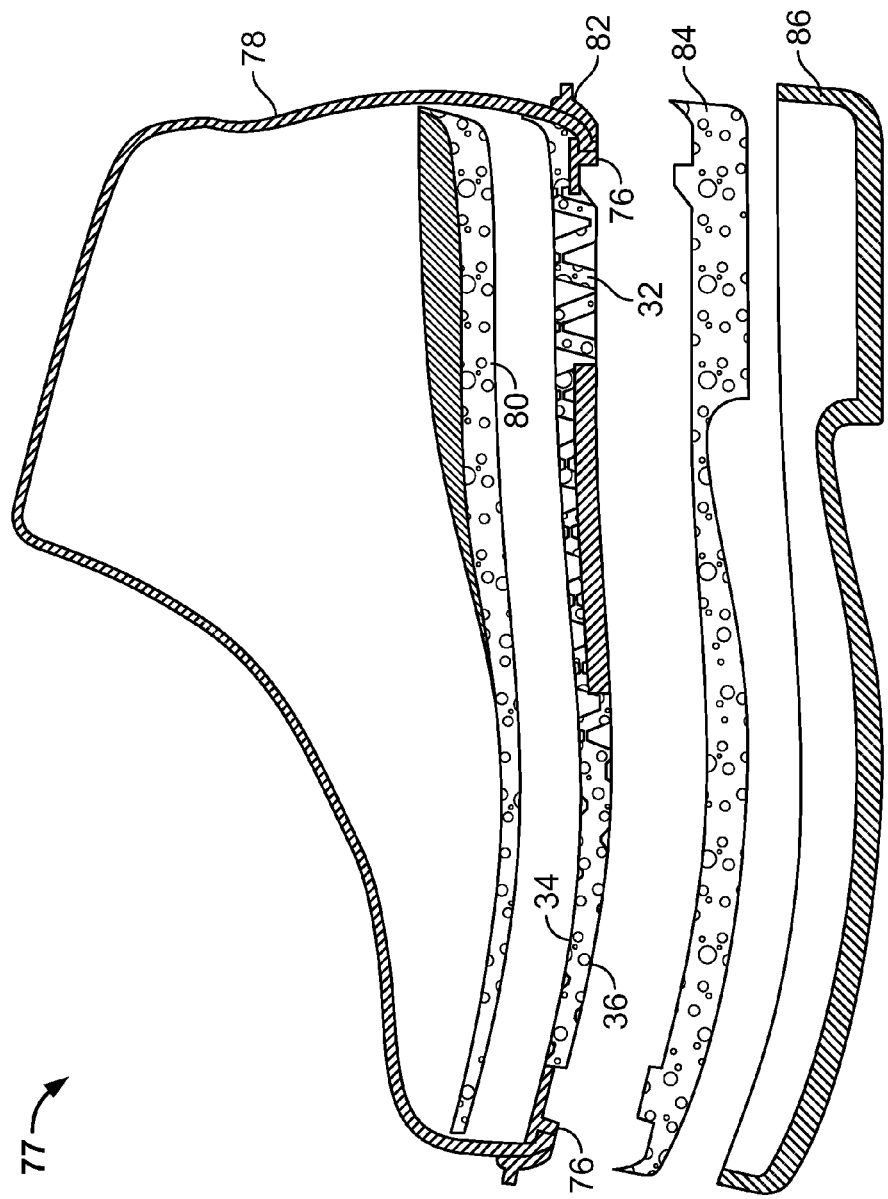
FIG. 7 is a cutaway view of a particular shoe construction including the cushioning support system of FIGS. 2-6C.

Referring now to FIG. 7, flexible ply rib 76 may be composed of a flexible plastic, such as thermoplastic urethane, ethylene-vinyl acetate (EVA), or engineered thermal plastic, and may provide an anchoring structure for securing a welt 82 to cushioning support system 20. Through the use of such welt 82, an upper 78 of a shoe may be secured to support system 20 so as to form a welted shoe 77. In a particular embodiment, a series of threads (not shown) may be threaded into the upper 78, through the welt 82, and into the flexible ply rib 76 so as to secure the upper 78 to cushioning support system 20. An insole 80 may then be placed over top surface 34 of anti-fatigue layer 32, a midsole 84 over bottom surface 36 of anti-fatigue layer 32, and, finally, an outsole 86 over the midsole 84 so as to form a welted shoe 77.

Construction of the aforementioned welted shoe 77 may also involve a number of different steps, as described below. As an initial step, a cushioning support system 20 including several of the aforementioned components may be provided, such components including, inter alia: (1) an inverted cone anti-fatigue layer 32 for providing cushioning; (2) a rigid shock diffusion welt-frame back part 60; (3) a flexible forepart welt-frame 66; (4) a torsional shank 72; and (5) a flexible ply rib 76, which may surround a periphery 26 of the support system 20. Upon manufacture of support system 20, in the manner described below or otherwise, an upper 78 may be provisionally secured to the flexible ply rib 76 via a staple or other securing mechanism (e.g., an adhesive). A welt 82 may then be placed over the provisionally secured upper 78, such that the welt 82 overlies the upper 78 and flexible ply rib 76. A series of threads (not shown) may then be threaded through the welt 82, into the upper 78, and through the flexible ply rib 76. The threads may then be tightened so as to firmly secure the upper 78 to the cushioning support system 20.

Subsequently, a midsole 84 may be secured to a bottom surface 36 of the inverted cone anti-fatigue layer 32 via an adhesive or other similar means. Combined with anti-fatigue layer 32, the midsole 84 may provide improved cushioning in the welted shoe 77. Similarly, an outsole 86 may be secured over the midsole 84 via an adhesive, or other similar means, thus providing a durable surface with which to contact the ground (e.g., a rubber or synthetic surface). Lastly, an insole 80 may be included with the welted shoe 77, so as to provide even more comfort for a user of the shoe 77. Such steps as described can be performed in the particular order above; although it is equally contemplated that the order of steps may be modified according to industry standards.

Figure 8:
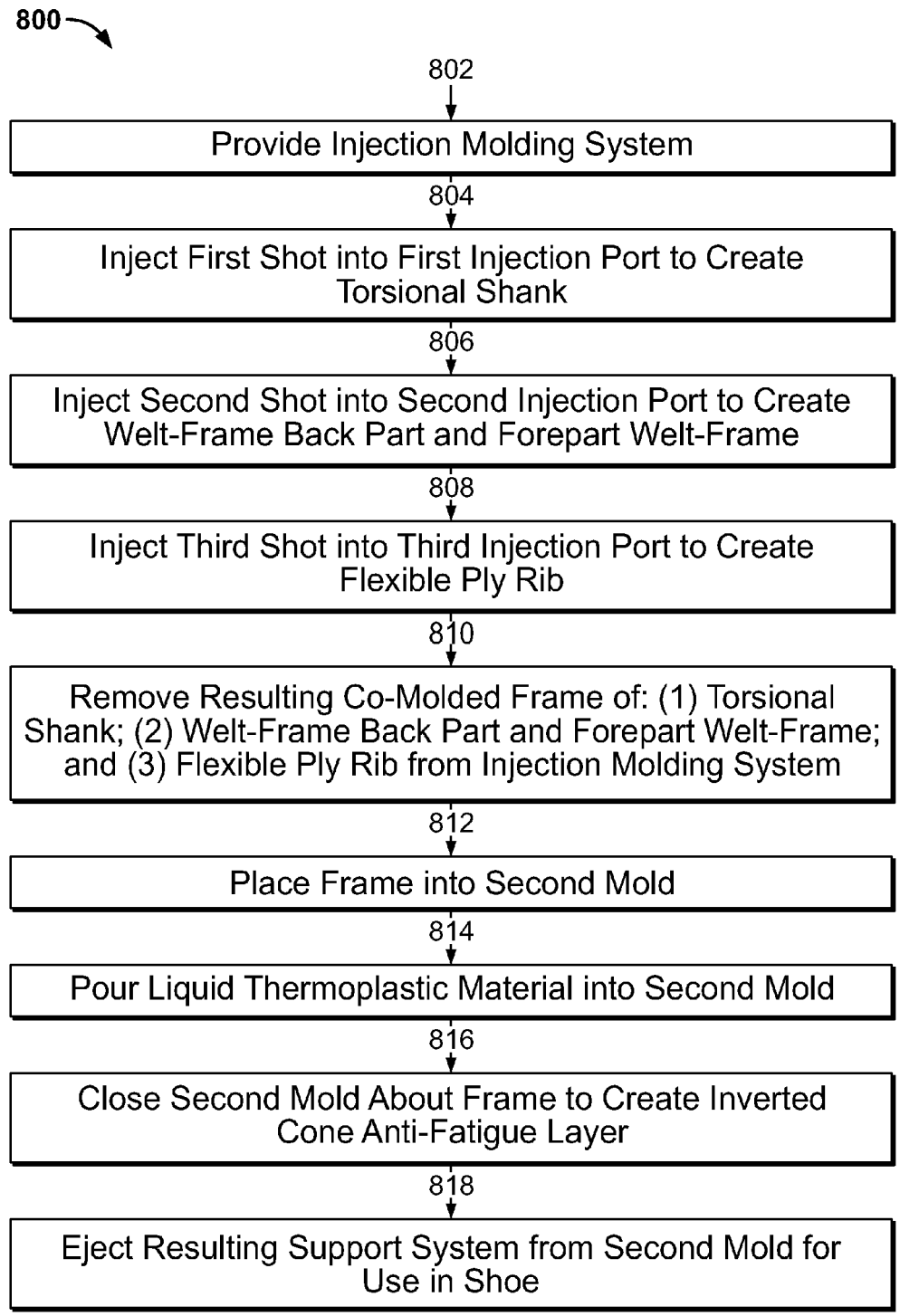
FIG. 8 illustrates one embodiment of the manufacturing process used to create the cushioning support system of FIGS. 2-6C.

Referring now to FIG. 8, manufacturing the aforementioned cushioning support system 20 may also include a number of steps 800, which may streamline efficiency and/or costs related to the production of a welted shoe 77. As a first step 802, an injection molding system may be provided, in which several portions of cushioning support system 20 may be molded. In a particular embodiment, the manufacturing process may begin with injection molding a torsional shank 72 (FIG. 2F), as shown in step 804. Specifically, a particular amount or "shot" of material may be heated so as to attain liquid characteristics. The "shot" of material may then be inserted into the injection molding system via an injection port, or other equivalent means. Upon entry into the injection molding system through the injection port, the first "shot" may interact with the molding system and be formed into the shape of a torsional shank 72, as hereinbefore described.

Stated differently, upon injection of the first shot through its corresponding injection port, the first shot of material may be situated in a mold having the configuration of torsional shank 72 (e.g., a Y-shaped mold). Upon cooling, the first shot may then solidify into the shape of shank 72.

Subsequently, a second shot of material may be provided for injection through a second injection port, so as to form rigid shock diffusion welt-frame back part 60 and flexible forepart welt-frame 66 (FIGS. 2D & E), as illustrated by step 806 of FIG. 8. Notably, both such components (e.g., welt-frame back part 60 and forepart welt-frame 66) may be molded together using one "shot." Thus, welt-frame back part 60 and forepart welt-frame 66 may be a single co-molded unit. Further, welt-frame back part 60 may be more rigid than forepart welt-frame 66, as previously described.

Upon injection of the second shot into the second injection port, rigid shock diffusion welt-frame back part 60 and flexible forepart welt-frame 66 may be molded over torsional shank 72 (FIG. 2A). Additionally, welt-frame back part 60 and forepart welt-frame 66 may be placed in a portion of the injection molding system, which corresponds to the shape of such components as hereinbefore described. Thus, as an example, welt-frame back part 60 and forepart welt-frame 66 may be placed in a mold, which is configured to create openings 62, 68 for receiving a heel 56 and toe 58 patch of anti-fatigue layer 32 (FIG. 2B).

As shown in step 808 of FIG. 8, a third shot of material may then be inserted through a third injection port so as to form flexible ply rib 76 (FIG. 2G). In a particular embodiment, the third shot of material may be inserted through the third injection port so as to form a ply rib 76, which overlies the already formed rigid shock diffusion welt-frame back part 60 and the flexible forepart welt-frame 66 (FIG. 2A). Additionally, as with the other molded components, flexible ply rib 76 may be molded into a shape corresponding to the shape of ply rib 76 as hereinbefore described. A flexible ply rib 76 forming a flange may therefore be formed on welt-frame back part 60 and flexible forepart welt-frame 66.

As shown in steps 810 and 812 of FIG. 8, after formation of the aforementioned components in the injection molding system, the resulting "frame" may be transferred into another mold within which an inverted cone anti-fatigue layer 32 may be formed. In a particular embodiment, this second molding system may be similar in shape to a waffle iron-type structure. Thus, the second molding system may be an open mold having a series of cone-shaped protruding structures for forming a pattern of cones 38 in anti-fatigue layer 32, as hereinbefore described.

Upon securing the aforementioned "frame" within this second molding structure (e.g., through the use of pins or otherwise), liquid material, typically in the form of a urethane based foam, may be poured over the "frame," as illustrated by step 814 of FIG. 8. The second molding system may then be closed about cushioning support system 20, as shown in step 816, so as to form an inverted cone anti-fatigue layer 32 having a pattern of cones 38. As previously described, this process permits a pattern of cones 38 to be formed in top and bottom surfaces 34, 36 of the anti-fatigue layer 32, as opposed to just bottom surface 36. Stated differently, since the second molding system may clamp about a "frame" comprised of already molded: (1) torsional shank 72; (2) rigid shock diffusion welt-frame back part 60 and flexible forepart welt-frame 66; and (3) flexible ply rib 76, a pattern of cones 38 may be formed into both the top and bottom surfaces 34, 36 of anti-fatigue layer 32. As a final step, 818, the resulting cushioning support system 20 may be ejected from the second mold for use in a shoe.

As alluded to previously, the manufacturing process described above may result in a support system 20 having the aforementioned pattern of cones 38, which is not found in previous welt constructions utilizing a cushioning layer with a cone-type geometry. Rather, with those systems, a pattern of cones may only be formed in a bottom surface of the cushioning layer due to manufacturing constraints resulting from the use of a stiff insole board. More specifically, in previous welt-constructions the insole board typically must be secured to a relatively flat portion of the cushioning layer. Accordingly, with these welt-constructions, the top surface of the cushioning layer is flat so as to allow for attachment to an insole board. A pattern of cones is therefore not formed in a top surface of the cushioning layer, thus resulting in a loss of cushioning potential. As such, a molding system that clamps about the cushioning layer to form a pattern of cones 38 as hereinbefore described is not feasible.

What's more, since a stiff insole board typically overlies the cushioning layer, a user's foot is separated from the cushioning layer by a stiff component (e.g., the insole board), which reduces cushioning potential and hardens the welted shoe. Moreover, a welt construction with such added components (e.g., a stiff insole board, etc.) typically increases the complexity of manufacturing. Put simply, an injection molding process of the type described above cannot be used with such welt constructions. Thus, the manufacture of cushioning support system 20 as described is improved over past systems. Likewise, the resulting product (e.g., cushioning support system 20) provides improved cushioning characteristics not enjoyed by previous welt constructions.

In the devices depicted in the figures, particular structures are shown that are adapted to provide improved cushioning for a welted shoe. One aspect of the invention also contemplates the use of any alternative structures for such purposes, including structures having different lengths, shapes, and configurations. For example, while the geometry of individual cones 31 has been described as being conical, other shapes are also contemplated, including a tapered hexagonal prism, a tapered square prism, a cube, or other like shapes. As another example, while individual cones 31 have been described as being formed in both top and bottom surfaces 34, 36 of anti-fatigue layer 32, it is equally contemplated that individual cones 31 in a pattern of cones 38 may be formed only on one such surface (e.g., top 34 or bottom 36 surface). Thus, any one of the previously described patterns of cones 38 may be formed in either top 34 or bottom 36 surface of anti-fatigue layer 32, instead of both such surfaces.

Even further, although toe 22 and heel 24 regions of the cushioning support system 20 have been described as including only large 40 and medium 42 cones, it is equally contemplated that such regions may include large 40, medium 42, and small 44 cones. For instance, while heel 24 and toe 22 regions of support system 20 have been described as having an alternating series of large 40 and medium 42 cones, such regions may also have a series of alternating large 40, medium 42, and/or small 44 cones. Thus, in one embodiment, a pattern of cones 38 may be formed into toe 22 and heel 24 regions of support system 20, in which medium 42 and small 44 cones alternate with one another both laterally and longitudinally along support system 20.

Likewise, while arch region 30 has been described as including only medium 42 and small 44 cones, it is equally contemplated that such region may include large 40, medium 42, and/or small 44 cones. Thus, similar to toe 22 and heel 24 regions, arch region 30 may include a series of alternating large 40, medium 42, and/or small 44 cones. As a particular example, a pattern of cones 38 may be formed into arch region 30 of support system 20, in which large 40 and small 44 cones alternate with one another both laterally and longitudinally along support system 20. Accordingly, it is contemplated that an alternating series of cones as described above may be combined in any number of fashions to create anti-fatigue layer 32.

Additionally, while the opening 62 in welt-frame back part 60 has been described as completely surrounding heel patch 56 of anti-fatigue layer 32, opening 62 may only partially surround heel patch 56. Likewise, while the opening 68 in flexible forepart welt-frame 66 has been described as completely surrounding toe patch 58 of anti-fatigue layer 32, opening 68 may only partially surround toe patch 58. Even further, although opening 62 in welt-frame back part 60 has been described as being oval in shape, other shapes for opening 62 are also contemplated, including circular, hexagonal, square, or the like.

Furthermore, although flexible forepart welt-frame 66 has been described as being more flexible in relation to rigid shock diffusion welt-frame back part 60, forepart welt-frame 66 may, in one embodiment, have the same rigidity as welt-frame back part 60, or even an elevated rigidity with respect to such back part 60.

As another example, while the manufacturing process for cushioning support system 20 has been described as utilizing a first, second, and third injection port, such injection ports may be substituted for just a single port. Thus, each "shot" of material, which is used to create the various components of cushioning support system 20, may be injected through a single port instead of multiple different injection ports.

Figure 9A:
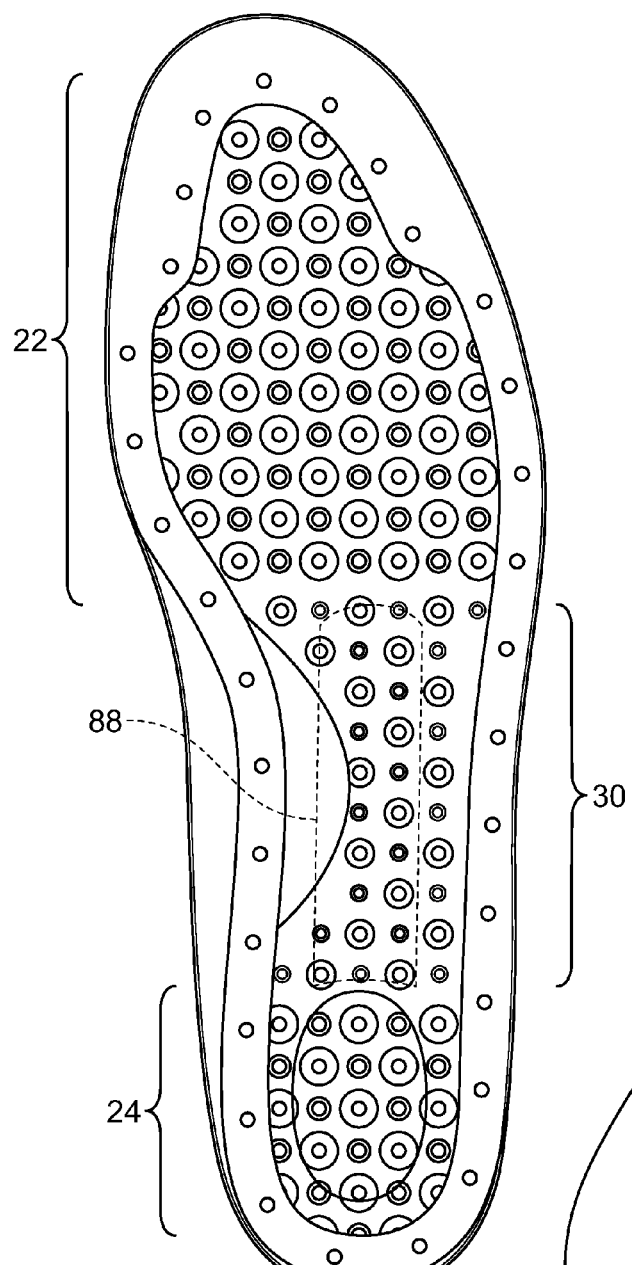
FIG. 9A is a top view of a cushioning support system in accordance with an alternate embodiment of the present invention.
Figure 9B:
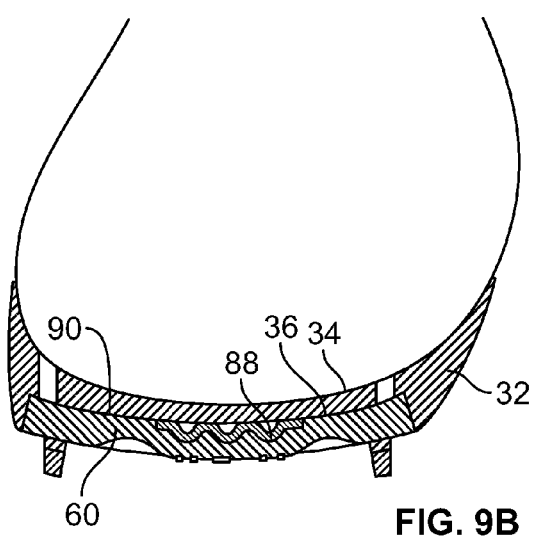
FIG. 9B is a cross-sectional view of an arch region of the cushioning support system of FIG. 9A.

As yet another example, while cushioning support system 20 has been described as utilizing only a single torsional shank 72, it is contemplated that an additional shank 88 may be included with support system 20. In a particular embodiment, as shown in FIGS. 9A and 9B, the shank 88 may be situated between the bottom surface 36 of anti-fatigue layer 32 and a top surface 90 of welt-frame back part 60. Moreover, like torsional shank 72, shank 88 may be situated within the arch region 30 of support system 20. Thus, additional support may be given to arch region 30 of support system 20 via an added shank 88. In one embodiment, shank 88 may be included in a cushioning support system 20 for use in a welted shoe, which has particular rigidity demands not otherwise required by general purpose shoes. In this regard, it is contemplated that shank 88 may be constructed of metal or of high strength plastic to provide such increased rigidity.

In a further embodiment, cushioning support system 20 may be used in a shoe having puncture resistant properties. For example, in particular industries shoes having puncture resistant properties (e.g., a resistance to puncture by nails, screws, and the like) are useful. To include such properties, cushioning support system 20 as hereinbefore described may be modified such that, in one embodiment, top surface 34 of anti-fatigue layer 32 may include a series of tapered hexagonal prisms formed therein. Like cones 31, these hexagonal prisms may also provide increased cushioning and energy return for support system 20.

Further, bottom surface 36 of anti-fatigue layer 32 may be relatively flat. Stated differently, bottom surface 36 may lack the aforementioned tapered hexagonal prisms. A puncture resistant material may then be formed onto flat bottom surface 36, so as to form a puncture resistant support system 20. Thus, the puncture resistant material may prevent a nail, screw, or the like from coming into contact with a user's foot. Moreover, as noted above, the tapered hexagonal prisms formed into the top surface 34 of anti-fatigue layer 32 may provide for improved cushioning. Accordingly, an improved puncture resistant support system 20 for use in a welted shoe may be created.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

It will also be appreciated that the various dependent claims and the features set forth therein can be combined in different ways than presented in the initial claims. It will also be appreciated that the features described in connection with individual embodiments may be shared with others of the described embodiments.

The invention claimed is:

1. A cushioning support system for use in an article of footwear, the cushioning support system having a series of components comprising:
   a cushioning layer having a top surface and a bottom surface, wherein a pattern of frustum-shaped recesses is formed into at least one of the top and bottom surfaces, each of the frustum-shaped recesses having a substantially continuous internal wall surface defining the frustum shape of each recess;
   a welt-frame assembly attached to the bottom surface of the cushioning layer, the welt-frame assembly having a rear part and a separate forepart; and
   a flexible ply rib connected to a periphery of the cushioning support system for securing to a welt,
   wherein the cushioning support system includes toe, heel, and arch regions and a longitudinal and lateral axis, the longitudinal axis extending from the toe region to the heel region and the lateral axis extending transverse to the longitudinal axis, and
   wherein a first one of the frustum-shaped recesses extends into the top surface of the cushioning layer and a second one of the frustum-shaped recesses extends into the bottom surface of the cushioning layer, the second frustum-shaped recess being inverted with respect to the first frustum-shaped recess, and
   wherein the cushioning support system is a sole element shaped according to the perimeter of a foot, such that the cushioning support system is adapted for use in the article of footwear.

2. The cushioning support system of claim 1, wherein the first frustum-shaped recess has a first depth and width and the second frustum-shaped recess has a second depth and width, each depth and width being different.

3. The cushioning support system of claim 2, wherein a first series of the first and second frustum-shaped recesses alternate along the lateral axis of the support system, and a second series of the first and second frustum-shaped recesses alternate along the longitudinal axis of the support system.

4. The cushioning support system of claim 2, wherein the first and second frustum-shaped recesses are defined by a generally frustoconical region terminating in a circular end, and the circular end of the first frustum-shaped recess is adjacent the circular end of the second frustum-shaped recess.

5. The cushioning support system of claim 1, wherein the welt-frame rear part includes an opening for insertion over a heel patch of the bottom surface of the cushioning layer, such that a portion of the heel patch extends through the opening.

6. The cushioning support system of claim 5, wherein the welt-frame rear part is more rigid than the welt-frame forepart, the welt-frame rear part extending through the arch region and into the heel region of the support system to provide support through the arch and heel regions.

7. The cushioning support system of claim 1, wherein the welt-frame forepart includes an opening for insertion over a toe patch of the bottom surface of the cushioning layer, such that a portion of the toe patch extends through the opening, and the welt-frame forepart is more flexible than the welt-frame rear part to provide flexibility in the toe region.

8. The cushioning support system of claim 1, wherein the flexible ply rib extends from a bottom surface of the welt-frame rear and foreparts, the ply rib including a flange extending about a periphery of the support system.

9. The cushioning support system of claim 1, further comprising a torsional shank associated with the welt-frame assembly rear part, the torsional shank being situated in the arch and heel regions of the support system to provide added support to the arch and heel regions.

10. The cushioning support system of claim 9, wherein the torsional shank has a Y-shape for augmenting the torsional stability of the shank.

11. The cushioning support system of claim 9, further comprising a second shank situated between the bottom surface of the cushioning layer and a top surface of the welt-frame rear part.

12. The cushioning support system of claim 1, wherein the pattern of frustum-shaped recesses is formed into both the top and bottom surfaces of the cushioning layer.

13. The cushioning support system of claim 1, wherein the shape of each of the frustum-shaped recesses is conical.

14. A shoe comprising:
a cushioning support system having a series of components including:
a cushioning layer having a top surface and a bottom surface, wherein a pattern of frustum-shaped recesses is formed into at least one of the top and bottom surfaces, each of the frustum-shaped recesses having a substantially continuous internal wall surface defining the frustum shape of each recess, wherein the recesses extend into the at least one of the top and bottom surfaces and, at least in part, interrupt the respective top or bottom surface to form openings in the respective surface;

a welt-frame assembly attached to the bottom surface of the cushioning layer, the welt-frame assembly having a rear part and a separate forepart; and
a flexible ply rib attached to a periphery of the cushioning support system, the cushioning support system including toe, heel, and arch regions and a longitudinal and lateral axis, the longitudinal axis extending from the toe region to the heel region and the lateral axis extending transverse to the longitudinal axis,
wherein the pattern of frustum-shaped recesses includes a first frustum-shaped recess with a first depth and width and a second frustum-shaped recess with a second depth and width, each depth and width being different, and
wherein the first frustum-shaped recess extends into the top surface of the cushioning layer and the second frustum-shaped recess extends into the bottom surface of the cushioning layer, the second frustum-shaped recess being inverted with respect to the first frustum-shaped recess; and
a welt secured to the flexible ply rib and attached to an upper of the shoe.

15. The shoe of claim 14, further comprising:
an insole connected to the top surface of the cushioning layer;
a midsole attached to the bottom surface of the cushioning layer; and
an outsole connected to the midsole.

16. The shoe of claim 14, wherein a first series of the first and second frustum-shaped recesses alternate along the lateral axis of the support system and a second series of the first and second frustum-shaped recesses alternate along the longitudinal axis of the support system.

17. The shoe of claim 14, wherein the first and second frustum-shaped recesses are defined by a generally frusto-conical region terminating in a circular end, and the circular end of the first frustum-shaped recess is adjacent the circular end of the second frustum-shaped recess.

18. The shoe of claim 14, wherein the pattern of frustum-shaped recesses is formed into both the top and bottom surfaces of the cushioning layer.

19. The shoe of claim 14, wherein the shape of each of the frustum-shaped recesses is conical.

* * * * *